United States Patent
Ibrir

(10) Patent No.: US 12,273,057 B2
(45) Date of Patent: Apr. 8, 2025

(54) SYSTEMS AND METHODS FOR SPEED REGULATION OF INDUCTION MOTORS

(71) Applicant: KING FAHD UNIVERSITY OF PETROLEUM AND MINERALS, Dhahran (SA)

(72) Inventor: Salim Ibrir, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 183 days.

(21) Appl. No.: 18/185,139

(22) Filed: Mar. 16, 2023

(65) Prior Publication Data

US 2024/0313685 A1    Sep. 19, 2024

(51) Int. Cl.
- *H02P 23/00* (2016.01)
- *H02P 1/26* (2006.01)
- *H02P 27/06* (2006.01)

(52) U.S. Cl.
CPC .............. *H02P 27/06* (2013.01); *H02P 1/265* (2013.01); *H02P 2207/01* (2013.01)

(58) Field of Classification Search
CPC ........ H02P 27/04; H02P 1/265; H02P 27/045; H02P 27/06; H02P 2207/01; H02P 6/17; G05B 19/232

See application file for complete search history.

(56) References Cited

U.S. PATENT DOCUMENTS

| | | | |
|---|---|---|---|
| 6,353,303 B1* | 3/2002 | Ramachandran | F04D 27/004 417/42 |
| 6,429,612 B1* | 8/2002 | Kume | H02P 3/18 318/807 |
| 10,439,540 B1* | 10/2019 | Chretien | H02P 27/08 |
| 2012/0186888 A1 | 7/2012 | Ross | |
| 2012/0212167 A1 | 8/2012 | Wu et al. | |
| 2019/0242947 A1* | 8/2019 | Smiley | G01R 31/343 |

FOREIGN PATENT DOCUMENTS

CN  204287965 U  *  4/2015

OTHER PUBLICATIONS

Aazmi et al. ; A review on VFD Control and Energy Management System of Induction Motor for Electric Vehicle ; 2021 IEEE 19th Student Conference on Research and Development (SCOReD) ; Dec. 2021 ; Abstract Only ; 3 Pages.

* cited by examiner

*Primary Examiner* — Karen Masih
(74) *Attorney, Agent, or Firm* — Oblon, McClelland, Maier & Neustadt, L.L.P.

(57) ABSTRACT

A system for speed regulation of an induction motor including an induction motor configured to be driven by a 3-phase alternating voltage (AC) signal. The system further includes an encoder configured to measure a shaft speed of the induction motor. Further, the system includes a variable frequency drive (VFD) device configured to generate the 3-phase AC signal to drive the induction motor. The system also includes a controller configured to generate a control voltage signal based on the measured shaft speed of the induction motor and a reference speed, the control voltage signal being input to the VFD device to control a frequency of the 3-phase AC signal.

18 Claims, 12 Drawing Sheets

SYSTEMS AND METHODS FOR SPEED REGULATION OF INDUCTION MOTORS

BACKGROUND

Technical Field

The present disclosure is directed to systems and methods for speed regulation of induction motors.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Induction motors (IMs) are widely used to run home appliances, pumps, production machines, electric cars, and other such industrial systems. In examples, alternating current (AC) machines are the most widely used devices because of their low cost, reliability, ruggedness, and easy maintenance. However, model-based control of induction motors is challenging due to the model nonlinearity and the unavailability of all state variables needed for closed-loop control.

In the past few decades, significant progress has been made in model-based control of AC machines using modern and nonlinear control techniques combined with nonlinear state observers. However, integration of these control techniques as standalone embedded control systems is a complicated task. As a consequence, further research on model-based control methodologies is required to simplify, append, and facilitate the overall real-time control techniques. In examples, a control procedure such as Field-Oriented Control (FOC) may be used to control a separately excited direct current (DC) motor. The FOC may be classified into two different techniques including an indirect FOC technique and a direct FOC technique. The indirect FOC technique and the direct FOC technique may aim to decouple the torque and the flux to realize induction motor torque control. In examples, the FOC may provide an acceptable transient response. Generally, the model-based control techniques require direct measurement or estimation of the phase currents, the rotational speed, and the motor flux. In examples, the measurements of the stator currents and the rotor speed are collected from current transducers, quadrature encoders, laser-based sensors, or tachometers. However, direct measurement of the machine flux is not possible, and therefore, a state observer is necessary to reconstruct the flux variable. In examples, the state observer may be dependent on the IM model which is subject to some uncertainties. Besides all these difficulties, stability analysis of the state observer-based controller should be provided for all types of induction motors.

induction motors are widely used by individuals, companies, and machineries of all types. The induction motors account for a half of energy consumed in the United States and many other populated countries. In examples, running the induction motors with a constant speed may not be the ideal solution to minimize the consumption of electricity. Moreover, in many other situations, the need to variate the speed of induction motors is necessary to perform different tasks.

Accordingly, it is one object of the present disclosure to to provide a method and system to regulate the speed of induction motors.

SUMMARY

In an exemplary embodiment, a system is disclosed. The system includes an induction motor configured to be driven by a 3-phase alternating voltage (AC) signal and an encoder configured to measure a shaft speed of the induction motor. The system further includes a variable frequency drive (VFD) device configured to generate the 3-phase AC signal to drive the induction motor. Also, the system includes a controller configured to generate a control voltage signal based on the measured shaft speed of the induction motor and a reference speed, the control voltage signal being input to the VFD device to control a frequency of the 3-phase AC signal.

In another exemplary embodiment, a method for speed regulation of an induction motor of a system is disclosed. The method includes measuring, by an encoder of the system, a shaft speed of the induction motor. The method further includes, generating, by a controller of the system, a control voltage signal based on the measured shaft speed of the induction motor and a reference speed. Also, the method includes generating, by a variable frequency drive (VFD) device of the system, a 3-phase alternating voltage (AC) signal to drive the induction motor, a frequency of the 3-phase AC signal being regulated based on the control voltage signal being input to the VFD device.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
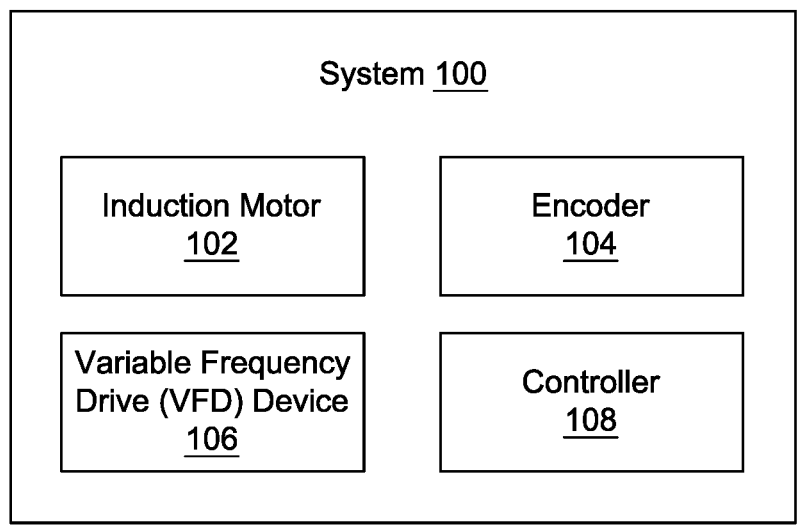
FIG. 1 depicts a system for speed regulation of induction motors, according to aspects of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed to systems and methods for speed regulation of induction motors. The present disclosure describes variable-frequency drive (VFD) based nonlinear control schemes for fast speed regulation of alternating current (AC) machines.

FIG. 1 depicts a system 100 for speed regulation of induction motors, according to aspects of the present disclosure.

The system 100 can include an induction motor 102, an encoder 104, a variable frequency drive (VFD) device 106, and a controller 108. In an embodiment, the induction motor 102 (also referred to as asynchronous motor) can be an alternating current (AC) electric motor in which an electric current in a rotor circuit needed to produce torque is obtained by electromagnetic induction resulting from a rotating magnetic field of a stator winding of the induction motor 102. The induction motor 102 can be configured to be driven by a 3-phase AC signal. In an example, the induction motor 102 can use 3-phase excitation to transform electric power into a mechanical rotation. The induction motor 102 can operate at a speed that is less than its synchronous speed. In an example, the induction motor 102 can be a marathon electric motor.

In an embodiment, the encoder 104 can be a rotary quadrature encoder. The encoder 104 can be configured to measure a shaft speed of the induction motor 102. In an aspect, the encoder 104 can be configured to measure the shaft speed of the induction motor 102 through a discrete differentiator. The VFD device 106 can be an electrical device used to control the speed and/or torque of the induction motor 102 by varying the signal frequency of the 3-phase AC signal that is input to the induction motor 102. The VFD device 106 can be configured to generate the 3-phase AC signal to drive the induction motor 102.

In an embodiment, the controller 108 can be hosted in a dedicated computing device (also referred to as a target computer). The controller 108 can be configured to generate a control voltage signal based on the measured shaft speed of the induction motor 102 and a reference speed. The control voltage signal can be input to the VFD device 106 to control or regulate a frequency of the 3-phase AC signal.

In examples, a flux amplitude of the magnetic flux can be directly proportional to a ratio of a voltage and a frequency of the 3-phase AC signal. In an embodiment, a relation between a speed of the rotation of the induction motor 102 and the frequency can be mathematically expressed using Equation (1) provided below.

$$\omega = 120 \frac{f}{p}, \quad (1)$$

where ω represents the speed of the rotation of the induction motor 102, f represents the input-voltage frequency, and p represents a number of motor poles.

The variation of the voltage and frequency affects both the strength of the magnetic field and the shaft speed of the induction motor 102. In an example, when the voltage and frequency decrease, the magnetic field increases, and consequently, an excessive amount of heat can be generated. In another example, when the voltage and frequency increase, the shaft speed of the induction motor 102 increases and the magnetic field decreases. As a result, a low torque is generated. In an embodiment, the induction motor 102 can operate in stable conditions if the magnetic field or the flux is of constant strength. Therefore, in order to maintain the magnetic flux invariant, the ratio of the voltage and frequency (i.e., V/Hz) should remain constant. As a result, the value of the torque remains stable, irrespective of the value of the frequency. The V/Hz control strategy preserves the V/Hz ratio constant. In an example, if the induction motor 102 is rated for 230V and 60 Hz, then the induction motor 102 can operate at a V/Hz ratio of 230/60 for all time when the voltage and the frequency are changed.

Figure 2:
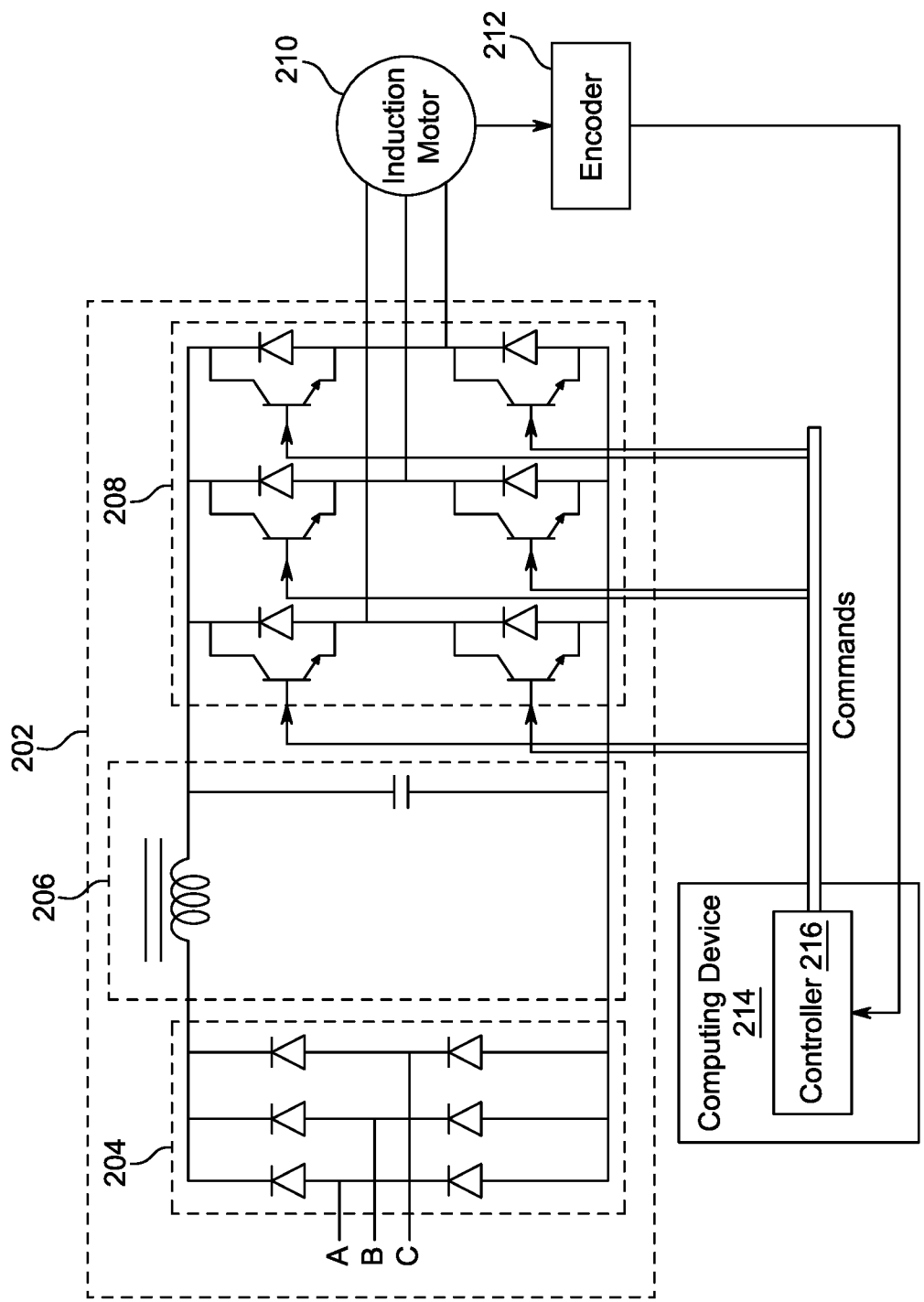
FIG. 2 depicts a block diagram of a variable frequency drive (VFD) device, according to aspects of the present disclosure.

FIG. 2 depicts a block diagram of a VFD device 202, according to aspects of the present disclosure. The VFD device 202 can be a power conversion device. The VFD device 202 includes a rectifier bridge converter (AC-DC converter) 204, a DC filter 206, and an IGBT inverter 208. As shown in FIG. 2, the VFD device 202 is communicatively connected to an induction motor 210, an encoder 212, and a computing device 214 hosting a controller 216. In an embodiment, the controller 216 can include/execute a control algorithm for managing the VFD device 202, the induction motor 210, and the encoder 212. In an example, the control algorithm can be of a first type or a second type. The first type of control algorithm is referred to as a first control algorithm, and the second type of control algorithm is referred to as a second control algorithm.

The controller (108, 216) can be configured to execute the first control algorithm or the second control algorithm to generate the control voltage signal based on the measured shaft speed of the induction motor (102, 210) and the reference speed. The control voltage signal can be input to the VFD device (106, 202) to control the frequency of the 3-phase AC signal.

In an embodiment, according to the first control algorithm, the control voltage signal can be set as provided below:

$$u_k = -\alpha \left| \omega_k - \omega_k^{ref} \right|^\beta \text{sign}(\omega_k - \omega_k^{ref}), \quad (2)$$

where, $\omega_k$ represents the measured shaft speed of the induction motor (102, 210), $\omega_k^{ref}$ represents the reference speed, and α and β are positive real numbers. In an example, α and β can be set as 1 and 0.2, respectively. In an example, the reference speed can be determined according to a pulse per revolution (PPR) of the encoder (104, 212). In an example, the PPR can be 2048. As described earlier, the shaft speed of the induction motor (102, 210) is measured through the differentiator. In an example, the output of the differentiator can be used in calculating the instantaneous value of the controller (108, 216) given by Equation (2).

In an embodiment, according to the second control algorithm, the control voltage signal can be set as provided below:

$$u_k = -\alpha |\omega(t) - \omega^{ref}(t)|^\beta \text{sign}(\omega(t) - \omega^{ref}(t)) - \gamma \int_0^t |\omega(s) - \omega^{ref}(s)|^\beta \text{sign}(\omega(s) - \omega^{ref}(s))ds, \quad (3)$$

where, $\omega(t)$ represents the measured shaft speed of the induction motor (102, 210), $\omega^{ref}(t)$ represents the reference speed, and α, β, and γ are positive real numbers. In an example, α, β, and γ can be set as 0.01, 0.2, and 0.03, respectively.

EXAMPLES AND EXPERIMENTS

Figure 3:
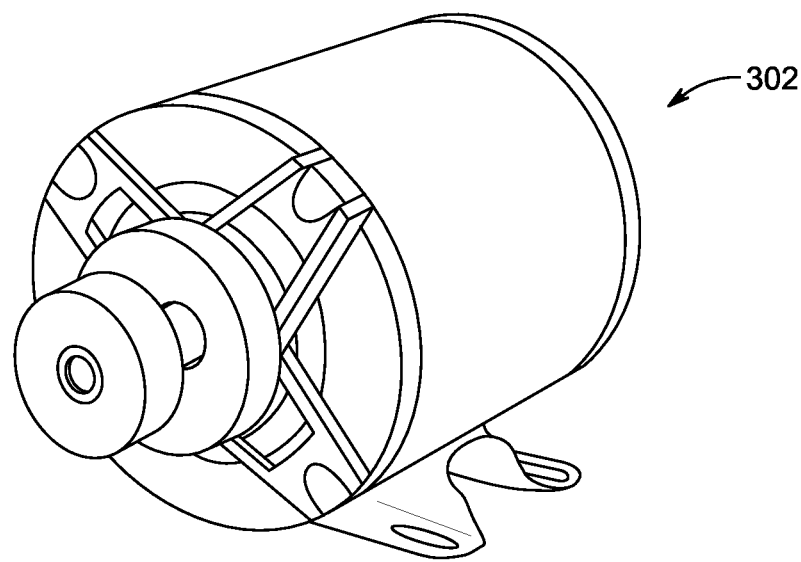
FIG. 3 depicts Texas instrument AC machine, according to aspects of the present disclosure.
Figure 4:
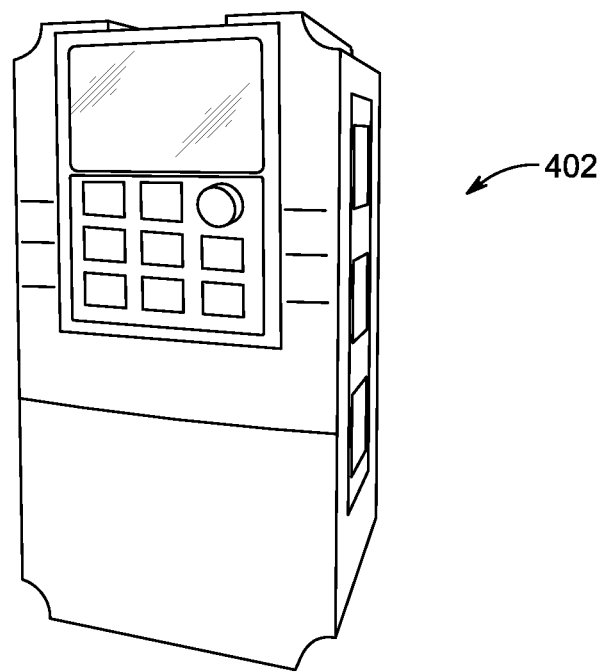
FIG. 4 depicts an ATO VFD, according to aspects of the present disclosure.

The described VFD based nonlinear control schemes for fast speed regulation of AC machines are evaluated in real-time on a Texas instrument AC machine driven by an ATO VFD. The Texas instrument AC machine (represented by reference number "302") is shown in FIG. 3 and the ATO VFD (represented by reference number "402") is shown in FIG. 4.

Figure 5:
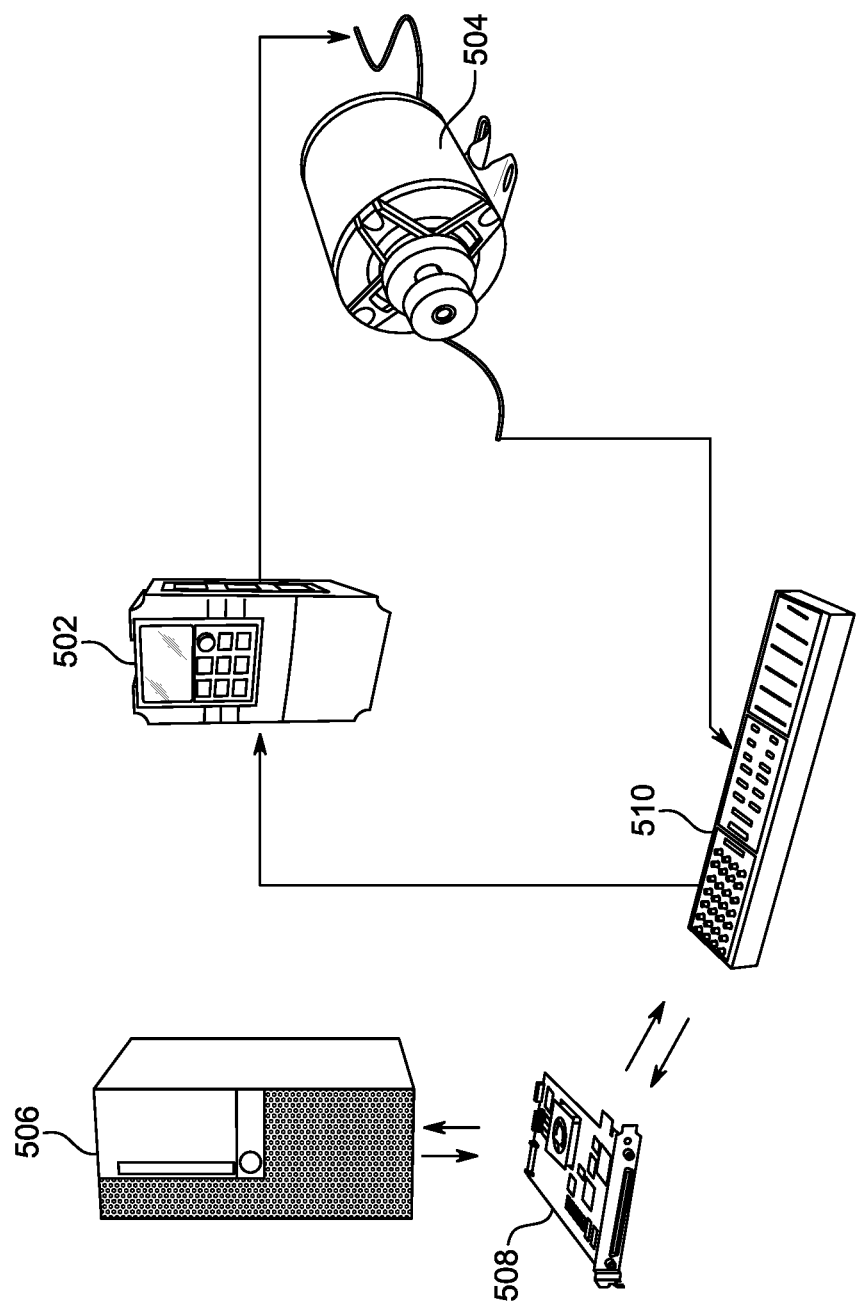
FIG. 5 depicts a block diagram of a nonlinear controller scheme for speed regulation of an induction motor, according to aspects of the present disclosure.

FIG. 5 depicts a block diagram of a nonlinear controller scheme for speed regulation of an induction motor, according to aspects of the present disclosure. FIG. 5 shows a VFD device 502, an induction motor 504 having an encoder, a computing device 506 hosting a controller 508, and a control panel 510. In an example, the VFD device 502 can be a GK3000 VFD. In an example, the controller 508 can be a dSPACE Controller 1104 (also referred to as ds1104 controller board, manufactured by dSPACE, 2540 N. 1st Street, Suite 201, San Jose, California, USA 95131).

In an embodiment, the VFD device 502 can be controlled by a control voltage signal generated from the controller 508. In an example, the range of an amplitude of the control voltage signal can be between 0V and 10V. Further, in an example, the control panel 510 can be equipped with multiple digital I/O, slave I/O PWM, encoder entries, and several DACs and ADCs.

Figure 6:
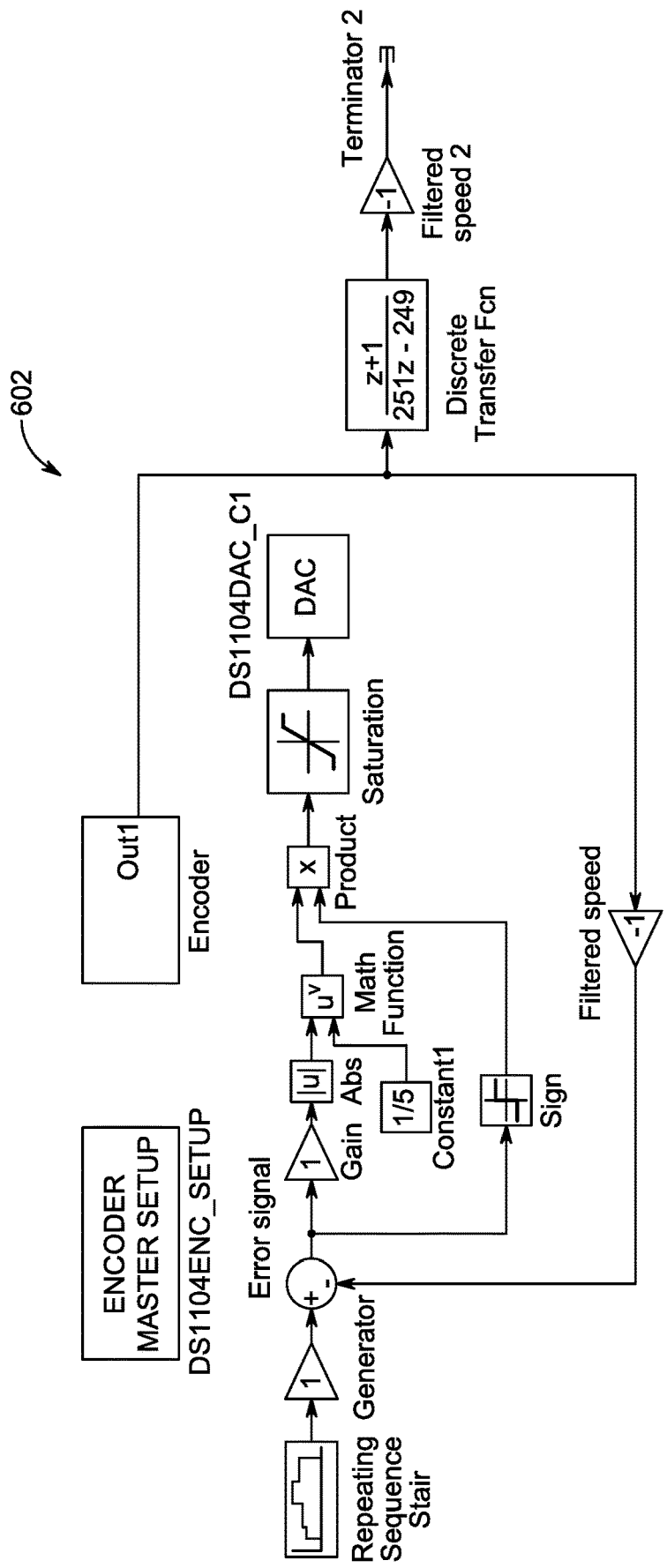
FIG. 6 depicts an exemplary model of a controller, according to aspects of the present disclosure.

FIG. 6 depicts an exemplary model 602 of the controller 508, according to aspects of the present disclosure. In an embodiment, code C of the model can be uploaded in the controller 508 (i.e., ds1104 controller board) which is directly connected to the control panel 510. The ds1104 controller board can be an electronic DSP-based board having I/O interfaces and a real-time processor. In an example, the ds1104 controller board can be installed in a free PCI slot connected to the control panel 510 that facilitates the acquisition of data from sensors and actuators. In an example, the ds1104 controller board can work with the Real-Time Interface (RTI) to easily generate the code C for real-time experimentations. In an example, ControlDesk software (developed by dSPACE, 2540 N. 1st Street, Suite 201, San Jose, California, USA 95131) can be used to monitor, calibrate, and record real-time data.

In an embodiment, the control voltage signal generated by the controller 508 can be directly connected to the VFD device 502. The VFD device 502 can allow the variation of the frequency of the control voltage signal used to power it. In an example, if the control voltage applied to the induction motor 504 is equal to the nominal value of 50 HZ, then the induction motor 504 can spin at its rated speed. By increasing or decreasing the voltage frequency, the induction motor 504 can run faster or slower than its nominal speed.

According to an embodiment, the controller 508 can be designed to change the frequency of the voltage that is applied to the induction motor 504 and the control voltage signal can be dependent on the error between the desired reference signal and the instantaneous value of the speed estimated from the encoder. In an example, the range of variation of the control voltage signal is between 0V and 10V. Therefore, a saturation function can be inserted in the closed-loop diagram of FIG. 6 to avoid over excitation and higher frequencies.

According to an embodiment, the structure of the controller 508 can be nonlinear and its implementation in processor-based target computers does not necessitate heavy calculation. Further, the controller parameters, namely α and β, do not need to be updated according to the reference signal properties. Furthermore, the controller 508 can be seen as an adaptive feedback whose gain is proportional to the error between the desired speed and the actual motor speed. The term $|\omega_k - \omega_k^{ref}|$ is identified as an adaptive gain of the feedback which is varying according to the speed error. When the error $\omega_k - \omega_k^{ref}$ is tending to zero, the control voltage signal decreases in turn to zero without significant overshoots. Extensive real-time simulations demonstrate this fact for different step references. According to the extensive real-time simulations, it was found that the nonlinear controller is suitable for real-time bounded control (e.g., the voltage limitation imposed by the VFD device which is 10 V).

As described earlier, the controller (108, 216) can be configured to execute the first control algorithm or the second control algorithm to generate the control voltage signal based on the measured shaft speed of the induction motor (102, 210) and the reference speed. The main difference between the first control algorithm and the second control algorithm is the type of control implemented in the ds1104 controller board. Equation (3) is a continuous form of the feedback provided by Equation (2). In an example, Equation (3) can ensure a fast convergence to the reference speed while the integral action eliminates the chattering phenomena and measurement errors induced by the encoder. The compromise between the fast convergence and precision is regulated by the constants α, β, and γ. The utilization of the ds1104 controller board with the ControlDesk software can permit to determine the optimal coefficients of the nonlinear feedback.

Figure 7:
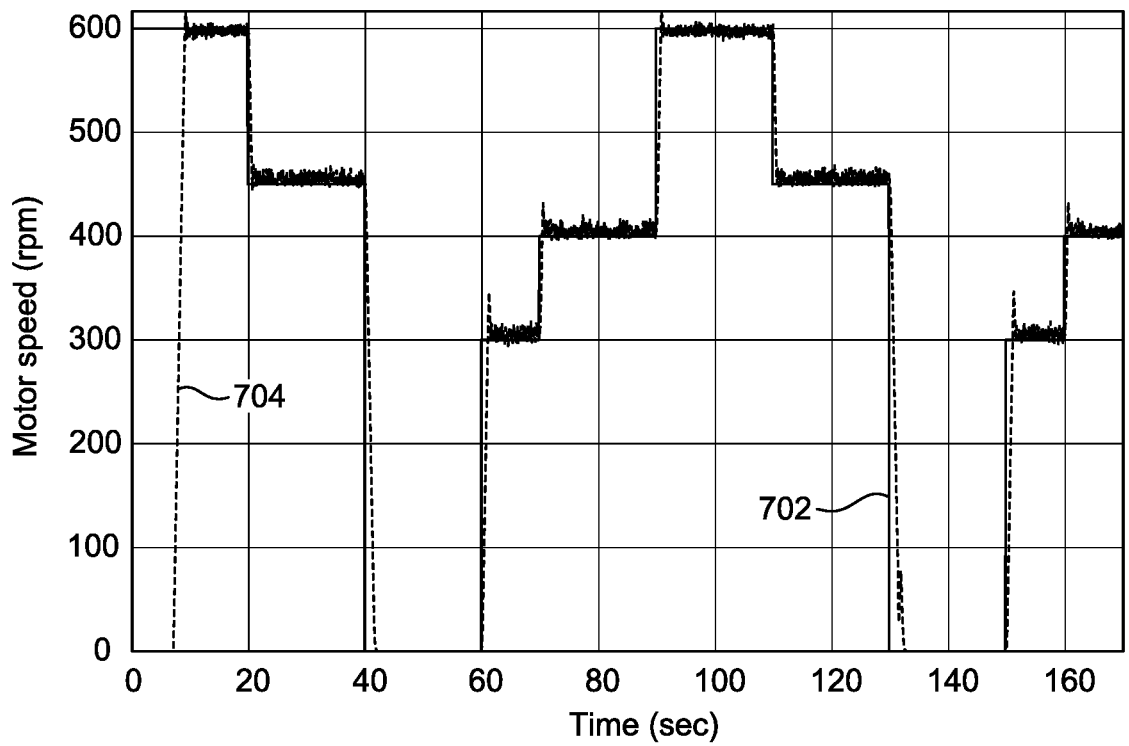
FIG. 7 is a plot illustrating a real-time induction motor speed signal and a reference speed signal, according to aspects of the present disclosure.

FIG. 7 is a plot illustrating a real-time induction motor speed signal and a reference speed signal, according to aspects of the present disclosure.

In FIG. 7, curve 702 represents the reference speed signal and curve 704 represents the induction motor speed signal. It can be seen in FIG. 7 that the induction motor speed signal 704 perfectly tracks the reference speed signal 702 over the whole simulation time. In the beginning of the real-time simulation, the controller action is delayed due to experimentation constraints. For this experiment, α and β are set to 1 and 0.2, respectively.

Figure 8:
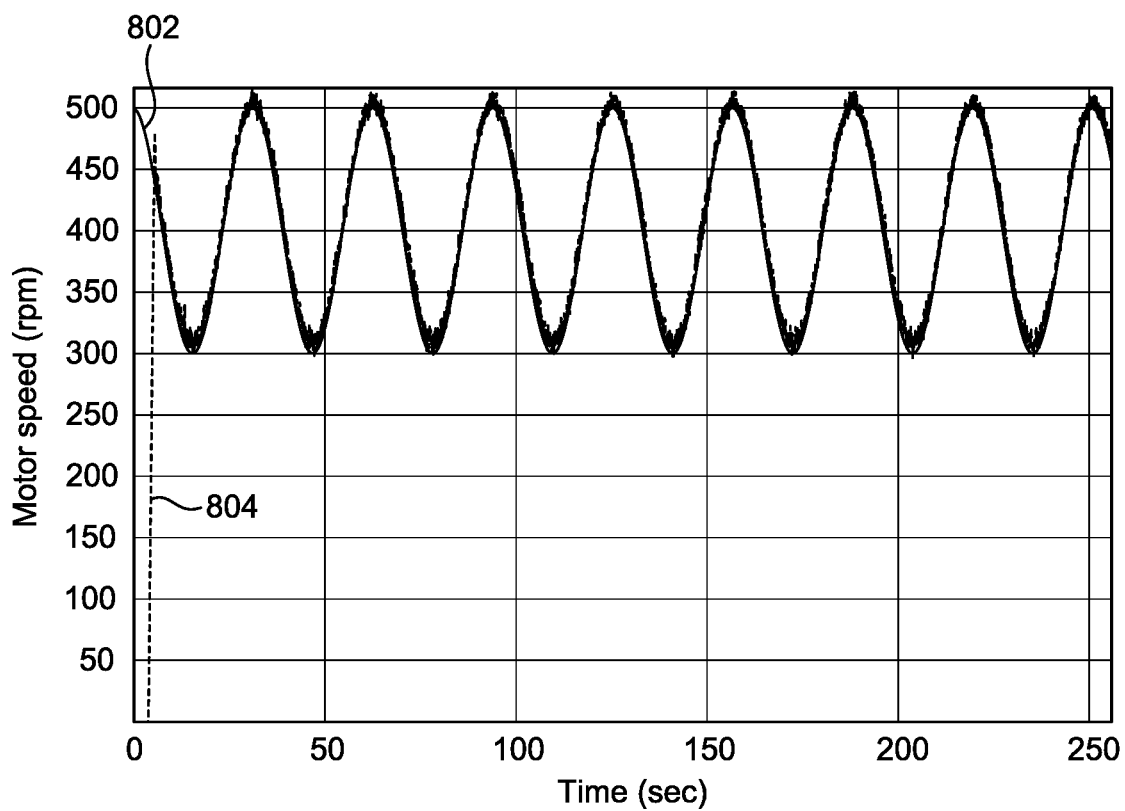
FIG. 8 is a plot illustrating a real-time induction motor speed signal and a sin-wave reference speed signal, according to aspects of the present disclosure.

FIG. 8 is a plot illustrating a real-time induction motor speed and a sin-wave reference speed signal, according to aspects of the present disclosure.

In FIG. 8, curve 802 represents the reference speed signal and curve 804 represents the induction motor speed signal. It can be seen in FIG. 8 that the induction motor speed signal 804 perfectly tracks the sin-wave reference speed signal 802. In an embodiment, the controller can be launched after an inactive time to see its performance in the first instants of the real-time simulation. It is noticed that the speed converges very rapidly to the sin-wave reference speed signal without exhibiting any significant overshoot.

Figure 9:
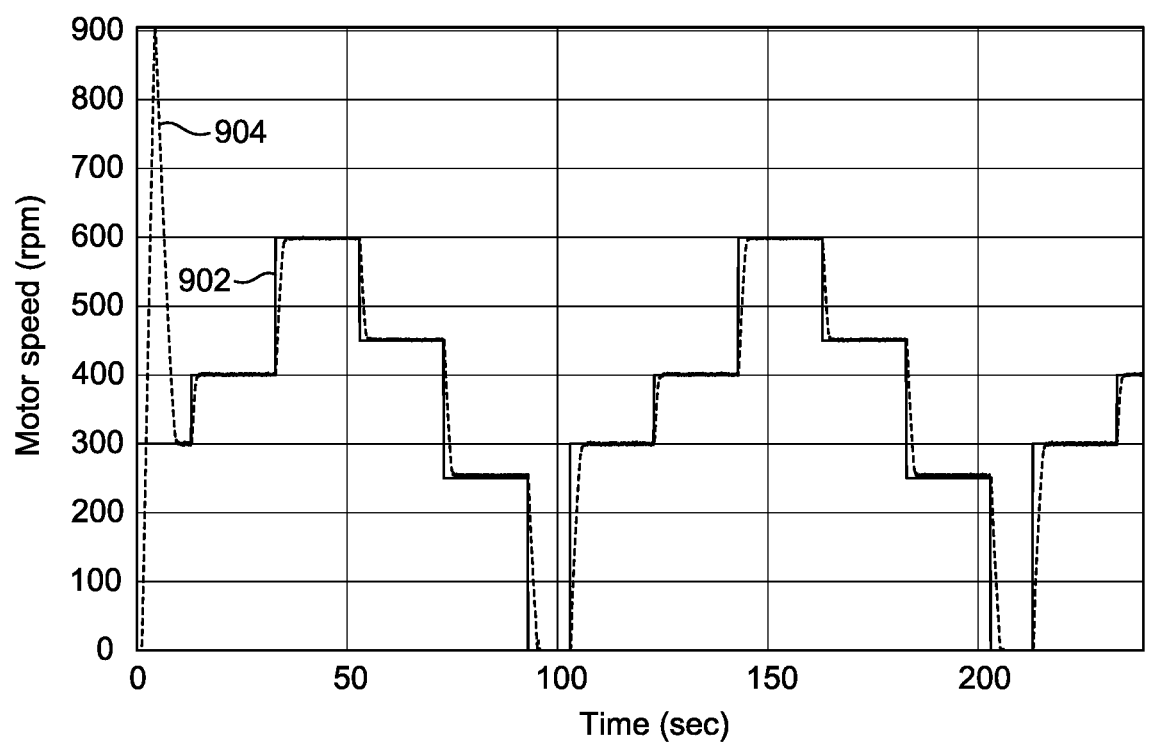
FIG. 9 is a plot illustrating a real-time induction motor speed signal and a multiple-step reference speed signal, according to aspects of the present disclosure.

FIG. 9 is a plot illustrating a real-time induction motor speed signal and a multiple-step reference speed signal, according to aspects of the present disclosure.

In FIG. 9, curve 902 represents the multiple-step reference speed signal and curve 904 represents the induction motor speed signal. It can be seen in FIG. 9 that the induction motor speed signal 904 perfectly tracks the multiple-step reference speed signal 902. As can be gathered from FIG. 7, FIG. 8, and FIG. 9, the control procedures offer smooth transient and steady state regimes for different reference speed signals. Accordingly, the motor speed precisely follows a prescribed trajectory without exhibiting overshoots while ensuring fast and smooth transition behaviors.

According to aspects of the present disclosure, the described control procedures can be implemented in stand-alone control devices and inserted with the control unit of AC machines equipped by digital encoders. The first control algorithm and the second control algorithm have shown their efficiency in varying the speed of the induction motor without excessive demand of energy. The control procedures can be implemented in variable-speed air conditioners, manufacturing processes, and high-precision motor control applications. Further, the control procedures do not depend on the AC machine model and its power. Therefore, the control procedures can be easily implemented for all kinds of AC machines. Additionally, the quality of feedback actions has a clear effect on the life of the AC machines and their maintenance cost.

Figure 10:
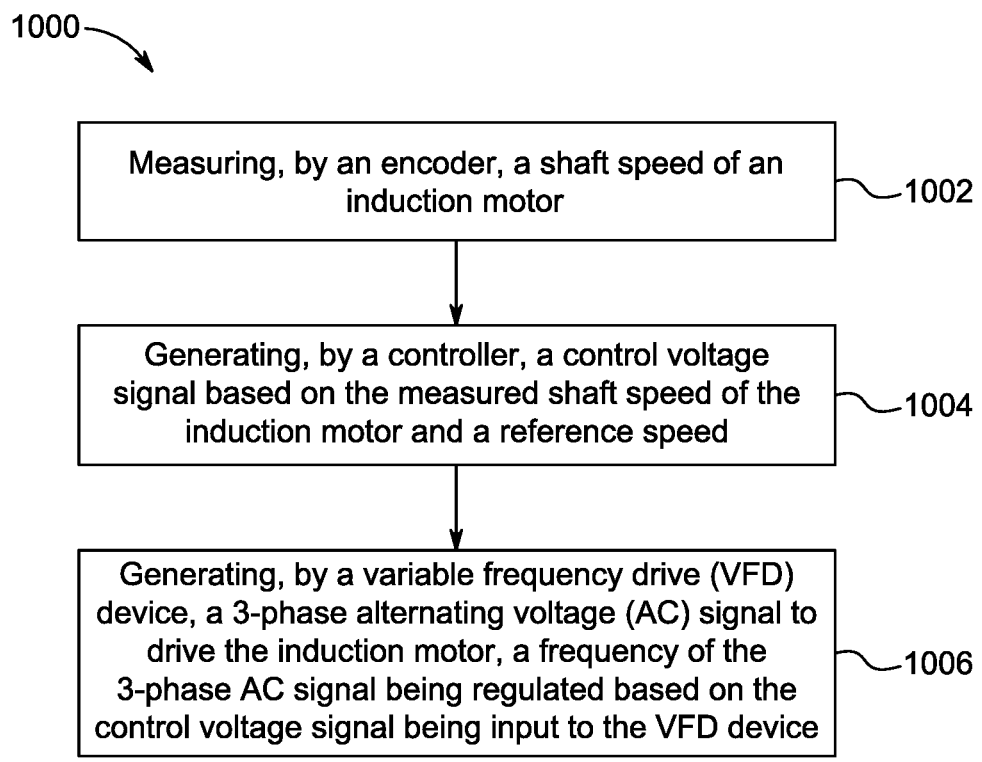
FIG. 10 illustrates a method for speed regulation of an induction motor, according to aspects of the present disclosure.

FIG. 10 illustrates a method 1000 for speed regulation of the induction motor 102, according to aspects of the present disclosure.

At step 1002, the method 1000 includes measuring, by the encoder 104, a shaft speed of the induction motor 102. In an example, the encoder 104 can be configured to measure the shaft speed of the induction motor 102 through a differentiator. In an example, the encoder 104 can be a rotary quadrature encoder.

At step 1004, the method 1000 includes generating, by the controller 108, a control voltage signal based on the measured shaft speed of the induction motor 102 and a reference speed. In an example, the reference speed is determined according to a pulse per revolution (PPR) of the encoder 104. In an example, the PPR is 2048.

In an embodiment, the control voltage signal can be set as $u_k = -\alpha|\omega_k - \omega_k^{ref}|^\beta \text{sign}(\omega_k - \omega_k^{ref})$ (as described in Equation (2)), where $\omega_k$ is the measured shaft speed of the induction motor, $\omega_k^{ref}$ is the reference speed, and α and β are positive real numbers. In an example, α and β are set as 1 and 0.2, respectively.

In an embodiment, the control voltage signal can be set as $u_k = -\alpha|\omega(t) - \omega^{ref}(t)|^\beta \text{sign}(\omega(t) - \omega^{ref}(t)) - \gamma \int_0^t |\omega(s) - \omega^{ref}(s)|^\beta \text{sign}(\omega(s) - \omega^{ref}(s))ds$ (as described in Equation (3)), where $\omega(t)$ is the measured shaft speed of the induction motor, $\omega^{ref}(t)$ is the reference speed, and α, β, and γ are positive real numbers. In an example, β, and γ are set as 0.01, 0.2, and 0.03, respectively. In an example, a range of an amplitude of the control voltage signal is between 0 and 10V.

At step 1006, the method 1000 includes generating, by the VFD device 106, a 3-phase AC signal to drive the induction motor 102, a frequency of the 3-phase AC signal being regulated based on the control voltage signal being input to the VFD device 106.

Figure 11:
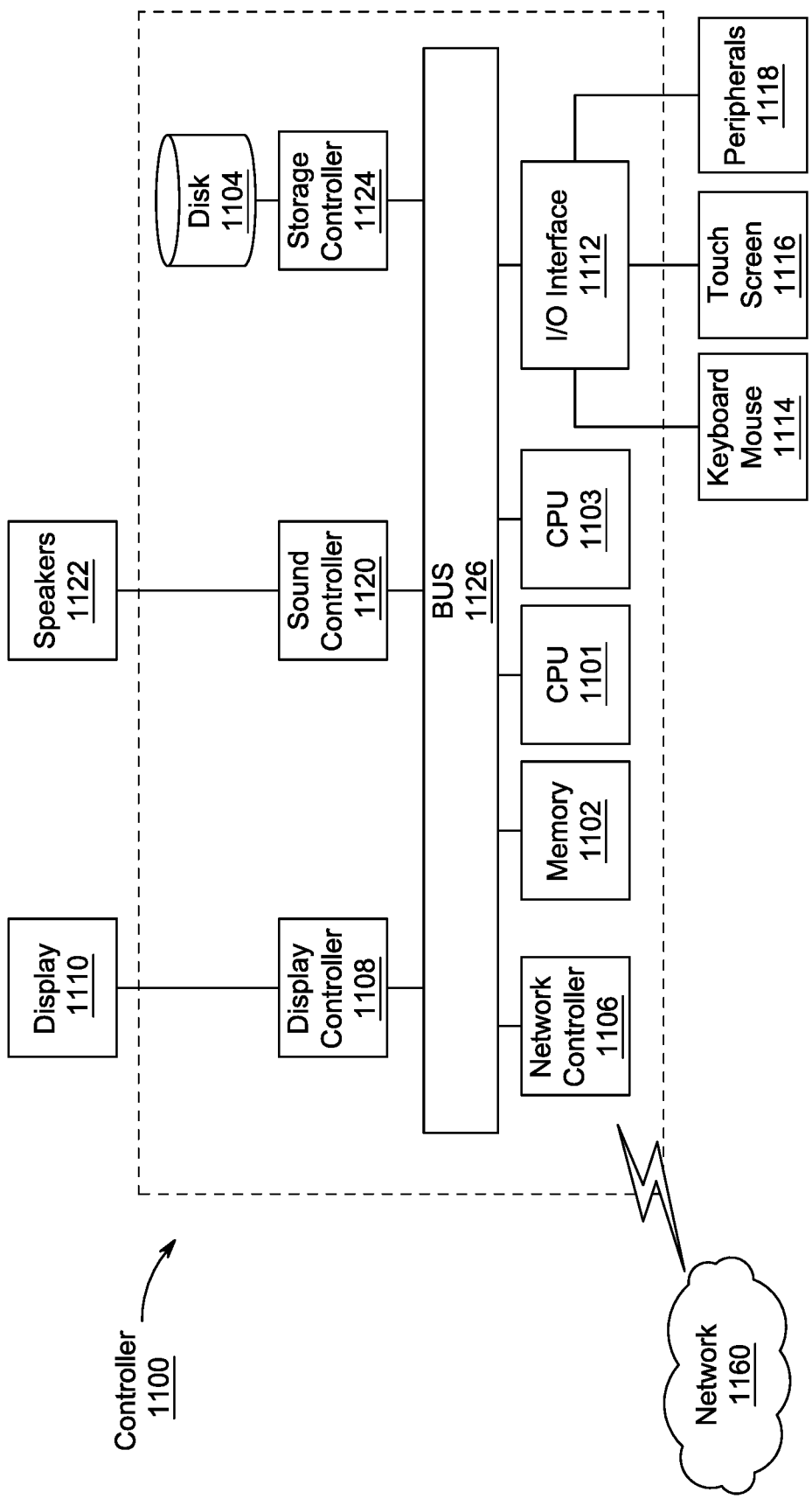
FIG. 11 is an illustration of a non-limiting example of details of computing hardware used in the computing system, according to aspects of the present disclosure.

Next, further details of the hardware description of the computing environment according to exemplary embodiments are described with reference to FIG. 11. FIG. 11 is an illustration of a non-limiting example of details of computing hardware used in the computing system, according to exemplary aspects of the present disclosure. In FIG. 11, a controller 1100 is described which is a computing device (for example, the system 100) and includes a CPU 1101 which performs the processes described above/below. The process data and instructions can be stored in memory 1102. These processes and instructions can also be stored on a storage medium disk 1104 such as a hard drive (HDD) or portable storage medium or can be stored remotely.

Further, the claims are not limited by the form of the computer-readable media on which the instructions of the inventive process are stored. For example, the instructions can be stored on CDs, DVDs, in FLASH memory, RAM, ROM, PROM, EPROM, EEPROM, hard disk or any other information processing device with which the computing device communicates, such as a server or computer.

Further, the claims can be provided as a utility application, background daemon, or component of an operating system, or combination thereof, executing in conjunction with CPU 1101, 1103 and an operating system such as Microsoft Windows 7, UNIX, Solaris, LINUX, Apple MAC-OS, and other systems known to those skilled in the art.

The hardware elements in order to achieve the computing device can be realized by various circuitry elements, known to those skilled in the art. For example, CPU 1101 or CPU 1103 can be a Xenon or Core processor from Intel of America or an Opteron processor from AMD of America, or can be other processor types that would be recognized by one of ordinary skill in the art. Alternatively, the CPU 1101, 1103 can be implemented on an FPGA, ASIC, PLD or using discrete logic circuits, as one of ordinary skill in the art would recognize. Further, CPU 1101, 1103 can be implemented as multiple processors cooperatively working in parallel to perform the instructions of the inventive processes described above.

The computing device in FIG. 11 also includes a network controller 1106, such as an Intel Ethernet PRO network interface card from Intel Corporation of America, for interfacing with network 1160. As can be appreciated, the network 1160 can be a public network, such as the Internet, or a private network such as an LAN or WAN network, or any combination thereof and can also include PSTN or ISDN sub-networks. The network 1160 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1108, such as a NVIDIA GeForce GTX or Quadro graphics adaptor from NVIDIA Corporation of America for interfacing with display 1110, such as a Hewlett Packard HPL2445w LCD monitor. A general purpose I/O interface 1112 interfaces with a keyboard and/or mouse 1114 as well as a touch screen panel 1116 on or separate from display 1110. General purpose I/O interface also connects to a variety of peripherals 1118 including printers and scanners, such as an OfficeJet or DeskJet from Hewlett Packard.

A sound controller 1120 is also provided in the computing device such as Sound Blaster X-Fi Titanium from Creative, to interface with speakers/microphone 1122 thereby providing sounds and/or music.

The general-purpose storage controller 1124 connects the storage medium disk 1104 with communication bus 1126, which can be an ISA, EISA, VESA, PCI, or similar, for interconnecting all of the components of the computing device. A description of the general features and functionality of the display 1110, keyboard and/or mouse 1114, as well as the display controller 1108, storage controller 1124, network controller 1106, sound controller 1120, and general purpose I/O interface 1112 is omitted herein for brevity as these features are known.

The exemplary circuit elements described in the context of the present disclosure can be replaced with other elements and structured differently than the examples provided herein. Moreover, circuitry configured to perform features described herein can be implemented in multiple circuit units (e.g., chips), or the features can be combined in circuitry on a single chipset, as shown on FIG. 12.

Figure 12:
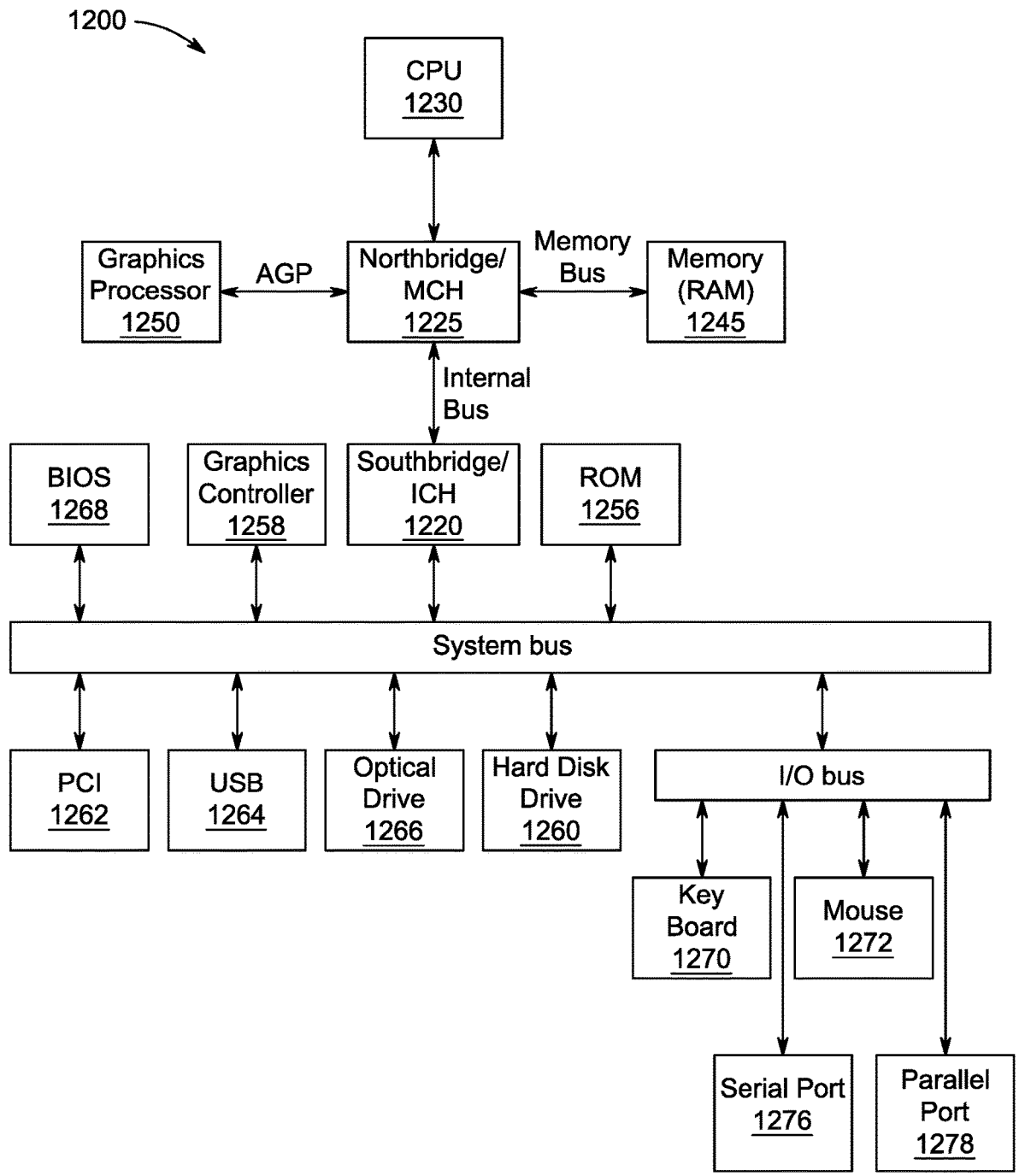
FIG. 12 is an exemplary schematic diagram of a data processing system used within the computing system, according to aspects of the present disclosure.

FIG. 12 shows a schematic diagram of a data processing system 1200 used within the computing system, according to exemplary aspects of the present disclosure. The data processing system 1200 is an example of a computer in which code or instructions implementing the processes of the illustrative aspects of the present disclosure can be located.

In FIG. 12, data processing system 1200 employs a hub architecture including a north bridge and memory controller hub (NB/MCH) 1225 and a south bridge and input/output (I/O) controller hub (SB/ICH) 1220. The central processing unit (CPU) 1230 is connected to NB/MCH 1225. The NB/MCH 1225 also connects to the memory 1245 via a memory bus, and connects to the graphics processor 1250 via an accelerated graphics port (AGP). The NB/MCH 1225 also connects to the SB/ICH 1220 via an internal bus (e.g., a unified media interface or a direct media interface). The CPU Processing unit 1230 can contain one or more processors and even can be implemented using one or more heterogeneous processor systems.

Figure 13:
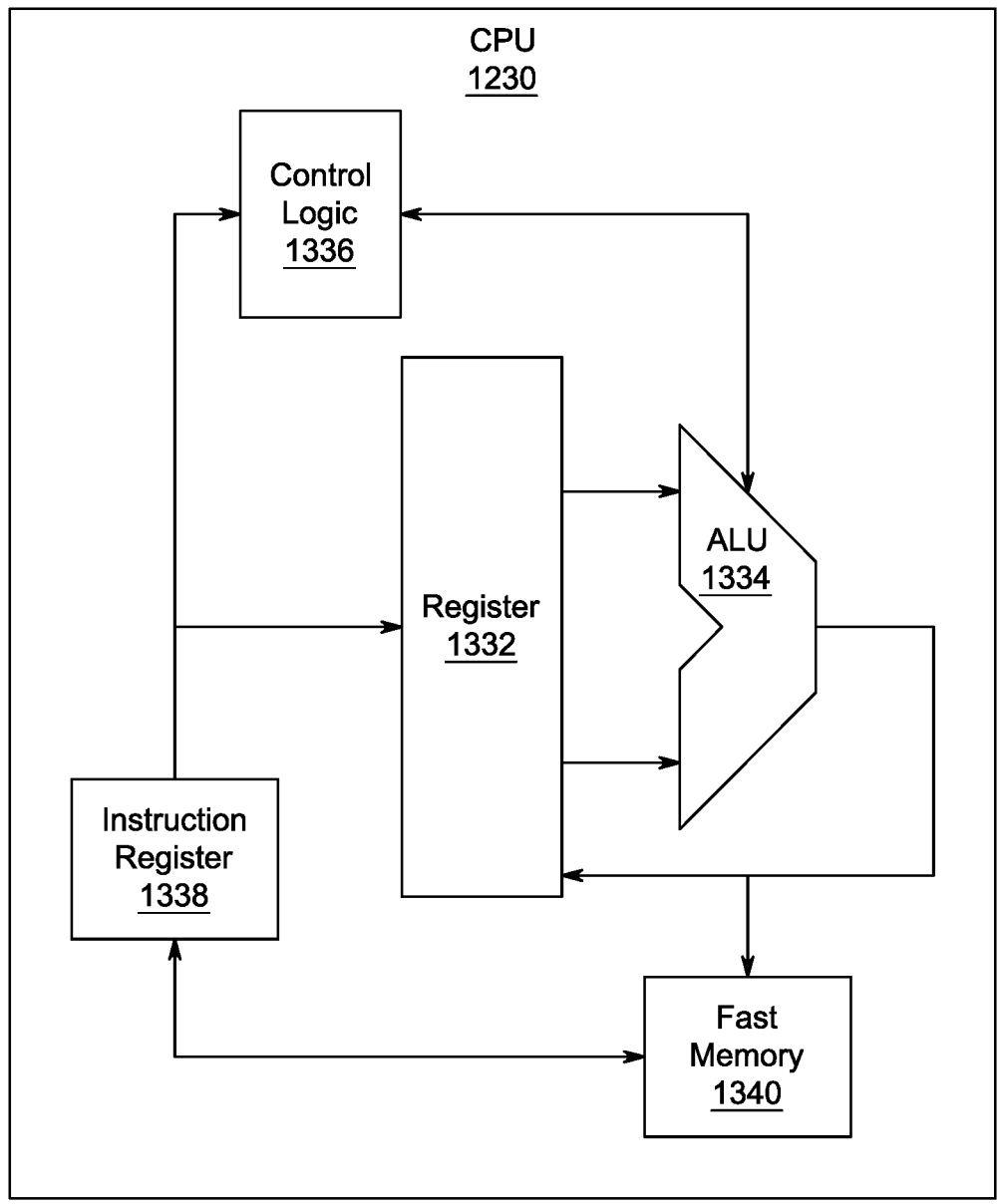
FIG. 13 is an exemplary schematic diagram of a processor used with the computing system, according to aspects of the present disclosure.

For example, FIG. 13 shows one aspects of the present disclosure of CPU 1230. In one aspects of the present disclosure, the instruction register 1338 retrieves instructions from the fast memory 1340. At least part of these instructions is fetched from the instruction register 1338 by the control logic 1336 and interpreted according to the instruction set architecture of the CPU 1230. Part of the instructions can also be directed to the register 1332. In one aspects of the present disclosure the instructions are decoded according to a hardwired method, and in another aspect of the present disclosure the instructions are decoded according to a microprogram that translates instructions into sets of CPU configuration signals that are applied sequentially over multiple clock pulses. After fetching and decoding the instructions, the instructions are executed using the arithmetic logic unit (ALU) 1334 that loads values from the register 1332 and performs logical and mathematical operations on the loaded values according to the instructions. The results from these operations can be feedback into the register and/or stored in the fast memory 1340.

According to certain aspects of the present disclosures, the instruction set architecture of the CPU 1230 can use a reduced instruction set architecture, a complex instruction set architecture, a vector processor architecture, a very large instruction word architecture. Furthermore, the CPU 1230 can be based on the Von Neuman model or the Harvard model. The CPU 1230 can be a digital signal processor, an FPGA, an ASIC, a PLA, a PLD, or a CPLD. Further, the CPU 1230 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 12, the data processing system 1200 can include that the SB/ICH 1220 is coupled through a system bus to an I/O Bus, a read only memory (ROM) 1256, universal serial bus (USB) port 1264, a flash binary input/output system (BIOS) 1268, and a graphics controller 1258. PCI/PCIe devices can also be coupled to SB/ICH 1220 through a PCI bus 1262.

The PCI devices can include, for example, Ethernet adapters, add-in cards, and PC cards for notebook computers. The Hard disk drive 1260 and CD-ROM 1256 can use, for example, an integrated drive electronics (IDE) or serial advanced technology attachment (SATA) interface. In one aspects of the present disclosure the I/O bus can include a super I/O (SIO) device.

Further, the hard disk drive (HDD) 1260 and optical drive 1266 can also be coupled to the SB/ICH 1220 through a system bus. In one aspects of the present disclosure, a keyboard 1270, a mouse 1272, a parallel port 1278, and a serial port 1276 can be connected to the system bus through the I/O bus. Other peripherals and devices that can be connected to the SB/ICH 1220 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein can be adapted based on changes on battery sizing and chemistry, or based on the requirements of the intended back-up load to be powered.

Figure 14:
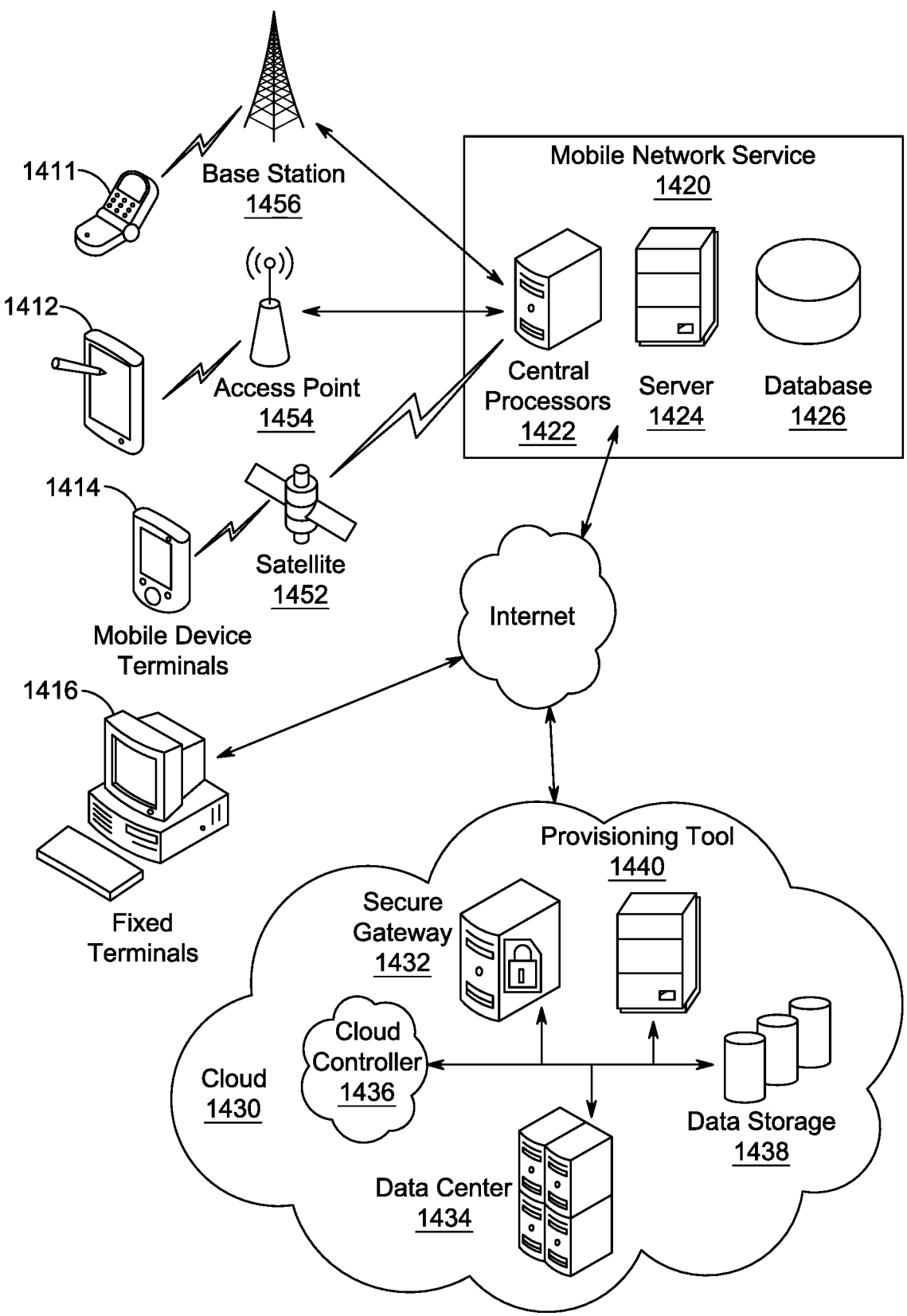
FIG. 14 is an illustration of a non-limiting example of distributed components which may share processing with the controller, according to aspects of the present disclosure.

The functions and features described herein can also be executed by various distributed components of a system. For example, one or more processors can execute these system functions, wherein the processors are distributed across multiple components communicating in a network. The distributed components can include one or more client and server machines, which can share processing, as shown by FIG. 14, in addition to various human interface and communication devices (e.g., display monitors, smart phones, tablets, personal digital assistants (PDAs)). More specifically, FIG. 14 illustrates client devices including a smart phone 1411, a tablet 1412, a mobile device terminal 1414 and fixed terminals 1416. These client devices can be commutatively coupled with a mobile network service 1420 via base station 1456, access point 1454, satellite 1452 or via an internet connection. Mobile network service 1420 can comprise central processors 1422, a server 1424 and a database 1426. Fixed terminals 1416 and mobile network service 1420 can be commutatively coupled via an internet connection to functions in cloud 1430 that can comprise security gateway 1432, data center 1434, cloud controller 1436, data storage 1438 and provisioning tool 1440. The network can be a private network, such as a LAN or WAN, or can be a public network, such as the Internet. Input to the system can be received via direct user input and received remotely either in real-time or as a batch process. Additionally, some aspects of the present disclosures can be performed on modules or hardware not identical to those described. Accordingly, other aspects of the present disclosures are within the scope that can be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the disclosure can be practiced otherwise than as specifically described herein.

The invention claimed is:

1. A system, comprising:
an induction motor configured to be driven by a 3-phase alternating voltage (AC) signal;
an encoder configured to measure a shaft speed of the induction motor;
a variable frequency drive (VFD) device configured to generate the 3-phase AC signal to drive the induction motor; and
a controller configured to generate a control voltage signal based on the measured shaft speed of the induction motor and a reference speed, the control voltage signal being input to the VFD device to control a frequency of the 3-phase AC signal;
wherein the control voltage signal is set as $u_k = -\alpha |\omega_k - \omega_k^{ref}|^\beta \mathrm{sign}(\omega_k - \omega_k^{ref})$, wherein $\omega_k$ is the measured shaft speed of the induction motor, $\omega_k^{ref}$ ref is the reference speed and $\alpha$ and $\beta$ are positive real numbers.

2. The system of claim 1, wherein $\alpha$ and $\beta$ are set as 1 and 0.2, respectively.

3. The system of claim 1, wherein a range of an amplitude of the control voltage signal is between 0 and 10V.

4. The system of claim 1, wherein the encoder is configured to measure the shaft speed of the induction motor through a differentiator.

5. The system of claim 1, wherein the encoder is a rotary quadrature encoder.

6. The system of claim 1, wherein the reference speed is determined according to a pulse per revolution (PPR) of the encoder.

7. The system of claim 6, wherein the PPR is 2048.

8. A system, comprising:
an induction motor configured to be driven by a 3-phase alternating voltage (AC) signal;
an encoder configured to measure a shaft speed of the induction motor;
a variable frequency drive (VFD) device configured to generate the 3-phase AC signal to drive the induction motor; and
a controller configured to generate a control voltage signal based on the measured shaft speed of the induction motor and a reference speed, the control voltage signal being input to the VFD device to control a frequency of the 3-phase AC signal;
wherein the control voltage signal is set as $u_k = -\alpha |\omega(t) - \omega^{ref}(t)|^\beta \mathrm{sign}\ (\omega(t) - \omega^{ref}(t)) - \gamma \int_0^t |\omega(s) - \omega^{ref}(s)|^\beta \mathrm{sign}(\omega(s) - \omega^{ref}(s)) ds$, wherein $\omega(t)$ is the measured shaft speed of the induction motor, $\omega^{ref}(t)$ is the reference speed, and $\alpha$, $\beta$, and $\gamma$ are positive real numbers.

9. The system of claim 8, wherein $\alpha$, $\beta$, and $\gamma$ are set as 0.01, 0.2, and 0.03, respectively.

10. A method for a speed regulation of an induction motor of a system, the method comprising:
measuring, by an encoder of the system, a shaft speed of the induction motor;
generating, by a controller of the system, a control voltage signal based on the measured shaft speed of the induction motor and a reference speed; and
generating, by a variable frequency drive (VFD) device of the system, a 3-phase alternating voltage (AC) signal to drive the induction motor, a frequency of the 3-phase AC signal being regulated based on the control voltage signal being input to the VFD device;
wherein the control voltage signal is set as $u_k = -\alpha |\omega_k - \omega_k^{ref}|^\beta \mathrm{sign}(\omega_k - \omega_k^{ref})$, wherein $\omega_k$ is the measured shaft speed of the induction motor, $\omega_k^{ref}$ is the reference speed, and $\alpha$ and $\beta$ are positive real numbers.

11. The method of claim 10, wherein $\alpha$ and $\beta$ are set as 1 and 0.2, respectively.

12. The method of claim 10, wherein $\alpha$ range of an amplitude of the control voltage signal is between 0 and 10V.

13. The method of claim 10, wherein the encoder is configured to measure the shaft speed of the induction motor through a differentiator.

14. The method of claim 10, wherein the encoder is a rotary quadrature encoder.

15. The method of claim 10, wherein the reference speed is determined according to a pulse per revolution (PPR) of the encoder.

16. The method of claim 15, wherein the PPR is 2048.

17. A method for a speed regulation of an induction motor of a system, the method comprising:
measuring, by an encoder of the system, a shaft speed of the induction motor;
generating, by a controller of the system, a control voltage signal based on the measured shaft speed of the induction motor and a reference speed; and
generating, by a variable frequency drive (VFD) device of the system, a 3-phase alternating voltage (AC) signal to drive the induction motor, a frequency of the 3-phase AC signal being regulated based on the control voltage signal being input to the VFD device;
wherein the control voltage signal is set as $u_k = -\alpha |\omega(t) - \omega^{ref}(t)|^\beta \mathrm{sign}\ (\omega(t) - \omega^{ref}(t)) - \gamma \int_0^t |\omega(s) - \omega^{ref}(s)|^\beta \mathrm{sign}(\omega(s) - \omega^{ref}(s)) ds$, wherein $\omega(t)$ is the measured shaft speed of the induction motor, $\omega^{ref}(t)$ is the reference speed, and $\alpha$, $\beta$, and $\gamma$ are positive real numbers.

18. The method of claim 17, wherein $\alpha$, $\beta$, and $\gamma$ are set as 0.01, 0.2, and 0.03, respectively.

* * * * *